March 6, 1956     K. E. THORNTON     2,737,562
HUMIDITY SENSING UNIT OF THE BIFILAR TYPE
Filed March 5, 1954
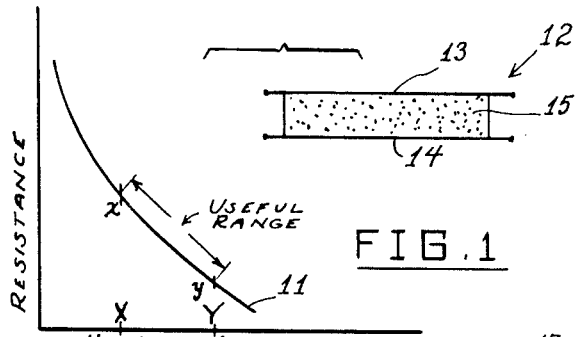
FIG.1
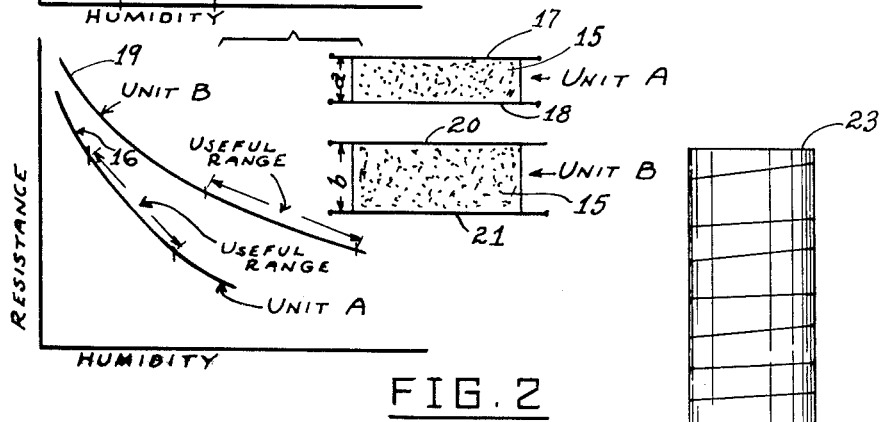
FIG.2
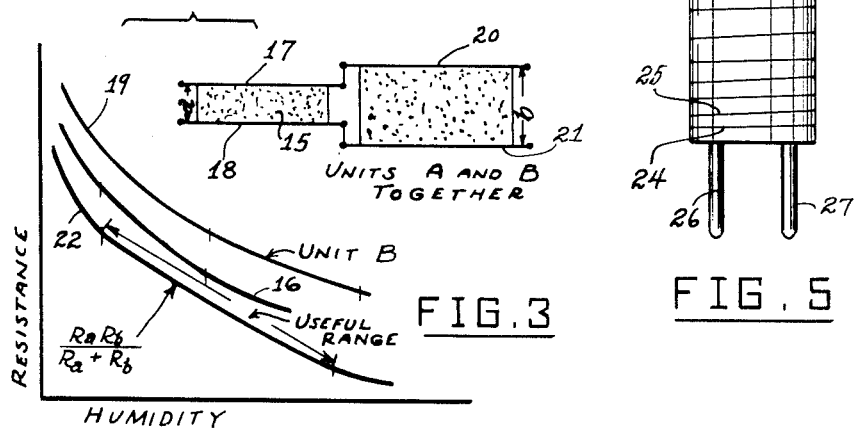
FIG.3
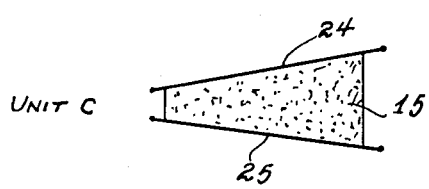
FIG.4
FIG.5
*INVENTOR.*
KATHLEEN E. THORNTON
BY Herman L. Gordon
ATTORNEY United States Patent Office 2,737,562
Patented Mar. 6, 1956

2,737,562

HUMIDITY SENSING UNIT OF THE BIFILAR TYPE

Kathleen E. Thornton, Montgomery County, Md., assignor to American Instrument Company, Inc., Silver Spring, Md.

Application March 5, 1954, Serial No. 414,487

6 Claims. (Cl. 201—63)

This invention relates to humidity sensing elements, and more particularly to an improved electrical humidity sensing element of the bifilar type.

A main object of the invention is to provide an improved bifilar electrical humidity sensing element which is simple in construction, which is easy to manufacture, and which has a more linear resistance-humidity characteristic than the bifilar humidity sensing elements heretofore known.

A further object of the invention is to provide an improved bifilar electrical humidity sensing element which may be readily manufactured by relatively simple production techniques, which is stable in performance, which has satisfactory lag characteristics, which can be employed in either high voltage or low voltage measuring and control circuits, and which has a greatly increased range of useful operation as compared with the bifilar humidity sensing elements at present available.

Further objects and advantages of the invention will become apparent from the following description and claims, and from the accompanying drawings, wherein:

Figure 1 is a graph representing a typical resistance-humidity characteristic of a bifilar humidity sensing element of the conventional type, having parallel-wound bifilar conductors.

Figure 2 is a graph showing the resistance-humidity characteristics of a pair of parallel-wound bifilar humidity sensing elements having different spacings between their bifilar conductors.

Figure 3 is a graph showing the resultant resistance-humidity characteristic obtained when the two parallel-wound bifilar units of Figure 2 are connected together.

Figure 4 is a diagrammatic developed view of a bifilar humidity sensing element having a tapered spacing between the bifilar conductors thereof, and providing substantially the same resultant resistance-humidity characteristic as shown in Figure 3.

Figure 5 is an elevational view of a bifilar wound humidity sensing element having a tapered spacing between its bifilar conductors, as in Figure 4.

Referring to the drawings, Figure 1 illustrates a typical resistance-humidity characteristic 11 of a parallel-wound bifilar humidity sensing element, for example, of a conventional humidity sensing element 12 having the spaced parallel conductors 13, 14, which are connected by a layer 15 of humidity-sensitive resistance material of the hygroscopic type, such as lithium chloride, or the like. As is well known, the curve 11, for a given spacing between the conductors 13, 14 is substantially linear over only a limited range of humidities, for example, between the points $x$ and $y$ of the curve in Figure 1, and between the corresponding humidity values X and Y. For practical purposes, the utility of the unit is limited to this range. If a different range of humidity values is to be studied, another sensing element having a different spacing between its parallel-wound bifilar conductors, or employing a different humidity sensitive coating must be employed.

For example, Figure 2 shows the resistance-humidity characteristic 16 of a first parallel-wound bifilar sensing element, designated as "Unit A," and having the spacing $a$ between its bifilar conductors 17 and 18. Designated at 19 is the resistance-humidity characteristic of a second parallel-wound bifilar sensing element "Unit B" having a substantially larger spacing $b$ between its bifilar conductors 20 and 21. From Figure 2 it will be seen that the linear portion, or useful range, of the characteristic 16 occurs at a different humidity region than the linear portion, or useful range, of the characteristic 19. By proper spacings $a$ and $b$, as practised at present by those skilled in the art, the useful range for the "Unit B" may be designed to begin at the end of the useful range for the "Unit A," whereby a range of humidities above the useful range for the "Unit A" may be studied by replacing the "Unit A" with the "Unit B."

A composite unit for use over the combined useful ranges of the units "A" and "B" may be constructed by connecting the parallel-wound bifilar conductors 17 and 18 respectively to the parallel-wound bifilar conductors 20 and 21, as illustrated in Figure 3, to obtain a resultant resistance-humidity characteristic 22 which is much flatter than either of the characteristics 16 or 19, and which has a substantially linear portion extending over a much wider humidity range than the linear portions of characteristics 16 and 19. The values represented by the curve 22 may be considered theoretically as being the equivalent of the parallel-connected resistance values of the curves 19 and 16, obtained by the expression $$R_{22} = \frac{R_a R_b}{R_a + R_b}$$

where $R_{22}$ is the resistance of the composite unit at a given humidity and $R_a$ and $R_b$ are the respective resistances of units "A" and "B" at said humidity.

For practical reasons, it is desirable to mount the bifilar conductors on a suitable form, such as the tubular form 23 in Figure 5. In view of this, and because it is desirable to obtain maximum linearity of the resistance-humidity characteristic, the spacing between the bifilar-wound conductors is varied gradually from one end of the unit to the other, as shown in Figure 4, wherein a tapered spacing is employed between the bifilar conductors 24 and 25 in the improved "Unit C." The resistance-humidity characteristic of "Unit C" is substantially the same as curve 22 in Figure 3.

The "Unit C" may be mounted on the cylindrical coil form 23 of Figure 5, and the bifilar conductors 24 and 25 may be connected to respective depending contact prongs 26 and 27 provided on said coil form. The humidity-responsive hygroscopic coating 15 is deposited over the bifilar conductors 24 and 25 in the usual manner.

While a specific embodiment of an improved humidity sensing element of the bifilar type has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a humidity sensing unit of the bifilar type, a support, a pair of bifilar conductors on said support, said conductors having linear main portions, and a body of hygroscopic material on said support connecting said conductors, said material having a resistance which varies in accordance with humidity, said linear main portions of the conductors being spaced apart by different transverse distances at different points linearly along said conductors.

2. In a humidity sensing unit of the bifilar type, a support, a pair of bifilar conductors on said support, said conductors having linear main portions, and a layer of humidity-sensitive material disposed on said support, said material extending between and electrically connecting said conductors, said material having a resistance which varies in accordance with humidity, the transverse spacing between said linear main portions of the conductors being non-uniform linearly along the unit.

3. In a humidity sensing unit of the bifilar type, a support, a pair of bifilar conductors on said support, said conductors having linear main portions, and a layer of humidity-sensitive material disposed on said support, said material extending between and electrically connecting said conductors, said material having a resistance which varies in accordance with humidity, the transverse spacing between said linear main portions of the conductors at different points linearly along the unit being substantially different.

4. In a humidity sensing unit of the bifilar type, a support, a pair of bifilar conductors on said support, said conductors having linear main portions, and a layer of humidity-sensitive material disposed on said support, said material extending between and electrically connecting said conductors, said material having a resistance which varies in accordance with humidity, the transverse width of the layer of material between said linear main portions of the conductors at different points linearly along the unit being substantially different in value.

5. In a humidity sensing unit of the bifilar type, a support, a pair of bifilar conductors on said support, and a layer of humidity-sensitive material disposed on said support, said material extending between and electrically connecting said conductors, said material having a resistance which varies in accordance with humidity, the spacing between the conductors tapering from one end of the unit to the other.

6. In a humidity sensing unit of the bifilar type, a support, a pair of bifilar conductors on said support, and a layer of humidity-sensitive material disposed on said support, said material extending between and electrically connecting said conductors, the width of the surface of the material between the conductors tapering in value from one end of the unit to the other.

References Cited in the file of this patent

UNITED STATES PATENTS 2,609,688     Larach _____ Sept. 9, 1952